Oct. 7, 1958     O. EK     2,855,093
STEEL BELT CONVEYOR AND ASSEMBLY
Filed Feb. 5, 1954
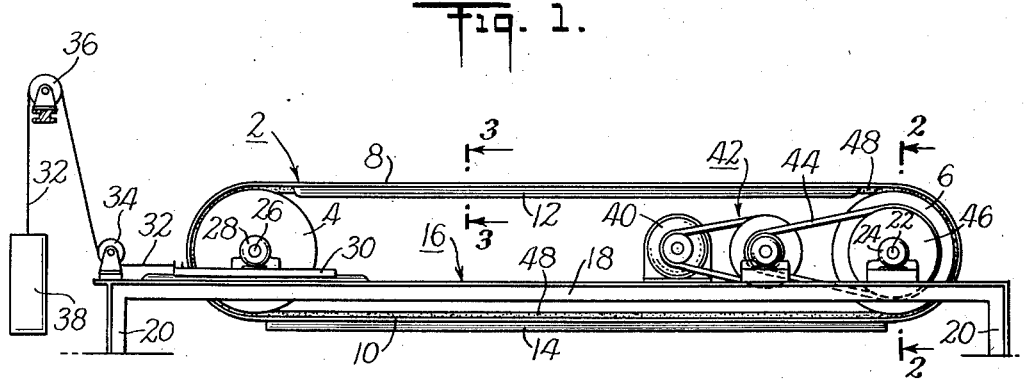
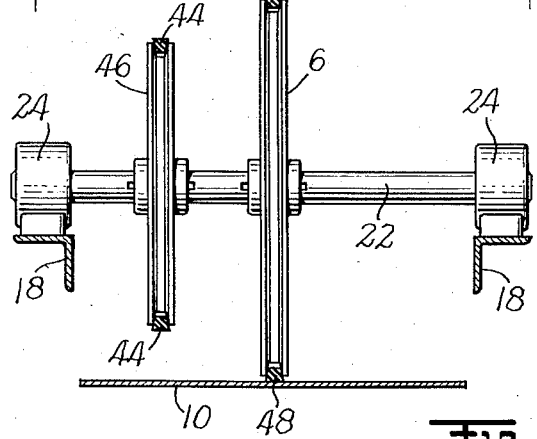
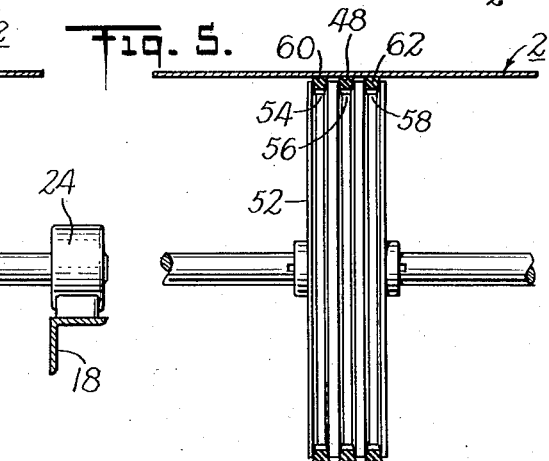
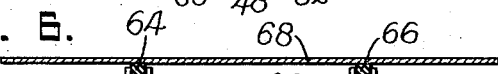
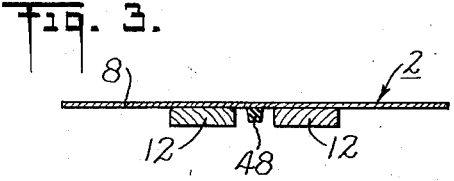
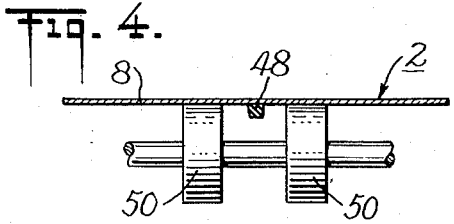
INVENTOR
Ossian Ek
BY
Curtis, Morris & Safford
ATTORNEYS United States Patent Office 2,855,093
Patented Oct. 7, 1958

1

2,855,093

STEEL BELT CONVEYOR AND ASSEMBLY

Ossian Ek, Glen Rock, N. J., assignor to Sandvils Steel, Inc., New York, N. Y., a corporation of New York Application February 5, 1954, Serial No. 408,509

13 Claims. (Cl. 198—193)

This invention relates to steel belt conveyors, and more in particular to the supporting and driving of an endless steel belt.

In the past, steel belts have been used to convey various types of material with the upper strand or run of the belt acting as the conveyor. Under such circumstances, the material to be conveyed is deposited on to the belt surface at the receiving end, and is removed at a selected zone or zones, or it may be discharged over the end of the belt. The lower strand or run of the belt may also be used as a conveyor, for example, to return the finished products from an assembly room when they are carried to the room by the upper run or strand. Steel belts are also used in many industrial operations where the functioning may be changed to meet different conditions of operation.

It is standard practice to support some such belts with two end pulleys, and with intermediate idler pulleys or stationary slats or runners positioned beneath the strands or runs. The end pulleys may provide sufficient tension to give substantial support to the belt, and one of the end pulleys is used to drive the belt. Furthermore, one of the end pulleys may be a guiding and tension pulley which is mounted upon a shaft, and the entire pulley and shaft assembly is urged longitudinally so as to hold the belt tight and to allow for expansion and contraction of the belt with changes in temperature.

With all types of steel conveyor belts which have been used in the past, considerable attention has been given to maintaining proper alignment of the belt, i. e., the belt must be supported and driven in such a manner that it will not ride to the sides of the pulleys. These pulleys are normally of relatively large diameter, and some are especially arranged to tend to make the belt ride back on to the pulley when it tends to go to the side. For this purpose, some pulleys have a central cylindrical surface upon which the center of the belt rides and tapered surfaces toward the edges of the pulleys over which the edges of the belt ride. In addition to this arrangement, some belt conveyor systems are provided with rather complicated control arrangements which swing or turn the axis of one of the end pulleys whenever the belt moves from its center position.

It is an object of the present invention to provide a steel belt conveyor assembly which accomplishes the results of those referred to above, but which is simple in construction, and which overcomes the difficulties which have been encountered in the past with such conveyors. It is a further object to provide a conveyor belt and mounting structure therefor which may be operated with great reliability, and wherein the belt will be driven efficiently and will maintain accurate alignment at all times. It is a further object to provide a conveyor belt and pulley assembly for supporting and driving the belt without the difficulties which have been encountered with such structures in the past. These and other objects will be in part obvious, and in part pointed out below.

2

Figure 1 is a somewhat schematic representation of one embodiment of the invention.

Figures 2 and 3 are vertical sections respectively upon the lines 2—2 and 3—3 of Figure 1.

Figure 4 is a view similar to Figure 3, but showing another embodiment of the invention.

Figures 5 and 6 are views similar to Figure 2, but showing other embodiments of the invention.

Referring to Figure 1 of the drawing, an endless steel belt 2 is supported between a pair of pulleys or sheaves 4 and 6, and has an upper strand or run 8, and a lower strand or run 10. These strands are supported by stationary slide members or runners 12 and 14 (see also Figure 3) extending along the under sides of the respective strands. Pulleys 4 and 6 (Figure 1) and runners 12 and 14 are mounted upon a frame construction 16, which includes a pair of horizontal side frame members 18 (see also Figure 2) and four vertical leg supports 20 at the corners. Each of the pulleys 4 and 6 is mounted upon a horizontal shaft; pulley 6 is mounted upon a shaft 22 (Figure 2) which is journaled at its ends in a pair of bearings 24 rigidly mounted upon the side frame members 18. Referring again to Figure 1, pulley 4 is mounted upon a shaft 26 which is journaled at its ends in a pair of bearings 28. Bearings 28 are slidable upon horizontal members 18; the bearings are rigidly fixed to a slidable C-frame 30 which has limited movement parallel to the strands 8 and 10 of the belt. Attached to the center of the C-frame is a cable 32 which extends around a pair of pulleys 34 and 36, and thence downwardly and carries at its end a weight 38. Hence, this weight urges pulley 4 to the left with a force that maintains the proper tension upon belt 2 and allows for changes in the length of the belt as its temperature changes.

Belt 2 is driven through pulley 6 at its right-hand end (Figure 1) by a motor 40 which transmits power through a speed-reducing gear assembly 42 and a V-belt 44 to a driving pulley 46 (see Figure 2) which is keyed to shaft 22. Hence, the operation of the driving motor 40 turns shaft 22 and this turns pulley 6. Pulleys 6 and 4 are identical and are of the V-belt or V-groove type. The steel belt 2 has a continuous V-belt 48 securely bonded to its inner surface throughout its length, and this V-belt rides in the V-grooves of pulleys 4 and 6. The steel belt 2 does touch the pulleys 4 and 6, so that the entire tension exerted on the steel belt is exerted through the contact between the V-belt 48 and the two pulleys 4 and 6. Therefore, the converging surfaces of the V-grooves in the two pulleys 4 and 6 are tightly engaged by the surfaces of the V-belt. This insures a very good driving relationship between pulley 6 and the V-belt and the steel belt 2. In addition to the driving relationship, the two pulleys 4 and 6 effectively hold the steel belt 2 in exact alignment at all times and no auxiliary means is needed to perform this function.

The upper and lower strands or runs 8 and 10 of the steel belt are supported by the runners 12 and 14, except at the ends of the belt adjacent pulleys 4 and 6. However, at each of these pulleys the belt makes a semi-cylindrical turn or shell-like configuration. This shape is defined by the pulley grooves so that smooth semi-cylindrical surfaces are formed and maintained. Therefore, the steel belt maintains its semi-cylindrical configuration, even though it has no support beyond the ends of the runners 12 and 14 other than the central support of the pulleys 4 and 6.

In the embodiment of Figure 4, the structure is identical with that of Figures 1 to 3, except that runners 12 and 14 are replaced by idlers 50 which are engaged by the lower surface of the strand or run.

In the embodiment of Figure 5, the drive pulley and the steel-belt supporting pulley are combined into one pulley 52. In this embodiment, the pulley 52 has three V-grooves 54, 56, and 58. The center V-groove 56 receives the V-belt 48 which is carried by the steel belt 2, and V-grooves 54 and 58 receive driving belts 60 and 62 respectively. The driving belts 60 and 62 are engaged by the inner surface of the steel belt 2; this insures tight engagement between the driving belts and the grooves of pulley 52. The engagement of the steel belt surface with driving belts 60 and 62 also adds stability to the steel belt.

In the embodiment of Figure 6, two separate V-belts 64 and 66 are bonded to a wide steel belt 68 and ride in pulleys 70 and 72, respectively. With this arrangement, an extremely wide steel belt 68 is supported and driven very adequately with a minimum of equipment. Furthermore, use of a plurality of V-belts bonded to the steel belt permits the transmitting of additional driving power to the belt as is desirable under heavy loading conditions. Under such circumstances, a multiple groove pulley may be used in place of pulley 74.

With the constructions herein disclosed, full advantage may be taken of the versatility of steel belt conveyors. For example, the embodiment of Figure 1 may be mounted upon rollers and moved to various locations for use. Illustratively, the load to be carried is placed on the left-hand end of the belt in Figure 1, and is discharged over the right-hand end to the right pulley 6. The lower strand 10 may be used to convey materials or articles from adjacent pulley 6 to the left toward pulley 4. The loading and unloading arrangements may be manual or automatic. However, with arrangements constructed in accordance with the present invention, no substantial harm results from failure to remove materials from the lower strand, for example, as they are being conveyed toward pulley 4. Hence, the extreme care which has been necessary in this regard with roller type of pulleys is not required.

As many possible embodiments may be made of the mechanical features of the above invention and as the art herein described might be varied in various parts, all without departing from the scope of the invention, it is to be understood that all matter hereinbefore set forth, or shown in the accompanying drawings is to be interpreted as illustrative and not in a limiting sense.

I claim:

1. In a steel belt conveyor construction, the combination of, a steel belt which is in the form of an endless band having an outer surface and an inner surface and extending in two parallel strands interconnected by substantially semi-cylindrical portions, supporting and driving means fixed to the central portion of said inner surface throughout the length of said belt, a pair of supporting pulleys positioned within said belt and engaged by said supporting and driving means without contact with said steel belt and acting through only the portions of said supporting and driving means at said substantially semi-cylindrical portions to support said steel belt, and driving means to impart driving movement to said steel belt, said belt being resilient and thick enough so that when bent around said supporting pulleys it maintains itself substantially rigid.

2. A belt conveyor as described in claim 1 wherein said endless belt is a steel belt of substantial width, and wherein said supporting and driving means is a V-belt which is bonded to said steel belt, and wherein said pulleys are in the form of V-pulleys which present V-grooves in which said V-belt is received snugly.

3. A belt conveyor as described in claim 2 which includes, drive means comprising a motor and gear-reduction assembly, pulley means presenting a V-groove and rigidly mounted with respect to one of said pulleys, and a driving belt extending between said assembly and the last-named V-groove.

4. A belt conveyor as described in claim 3 which includes a plurality of V-belts substantially as described, and a plurality of pulleys positioned respectively as described and cooperating with said V-belts.

5. A belt conveyor as described in claim 3 which includes, stationary runners positioned beneath and supporting said strands.

6. A belt conveyor as described in claim 3 which includes, idler rollers supporting said strands.

7. A steel belt conveyor of the character described comprising, an endless thin un-stretchable steel belt of substantial width having two flat portions connected at their ends respectively by curved semi-cylindrical loops, a narrow deformable driving belt having a higher coefficient of friction than the steel belt and bonded to the inside thereof parallel to the edges of the steel belt, and spaced pulleys engaging the semi-circular loop portions of the driving belt, said pulleys engaging only the driving belt, and means for driving one of the pulleys which engages the driving belt to drive the endless steel belt, said belt being resilient and thick enough so that when bent around said supporting pulleys it maintains itself substantially rigid.

8. In a conveyor arrangement wherein an endless loop formed by a metal belt is positively driven and aligned by supporting wheel means, a wide thin metal belt in the form of an endless loop having high tensile strength and being substantially non-stretchable and flexible, said metal belt being sufficiently thick and resilient to tend to maintain the belt in substantially rigid semi-cylindrical condition at the ends of the loop and in generally flat condition therebetween, a narrow strip of a relatively deformable and elastic material firmly attached along its length to the inside of said loop generally parallel to an edge thereof, and two relatively large-diameter mounting wheels rotatably mounted upon parallel axes and being generally in the same plane, said wheels being much narrower than said metal belt, each of said wheels bearing against said narrow strip and positively engaging it at the respective inside ends of said loop and supporting the belt in taut condition, whereby said loop is supported at each end by said wheels and can be driven with great tractive force by one of said wheels even though said strip has low tensile strength, and whereby said metal belt is held aligned from side-by-side by the engagement of said wheels with said strip.

9. The combination of elements as described in claim 8 wherein said loop is a band of flexible sheet steel, and wherein said strip is a V-belt bonded continuously to the inside surface of said metal belt, and wherein said wheels are grooved pulleys, said V-belt having such a cross-section relative to the grooves in said pulleys that neither of the pulleys touches said metal belt even when said conveyor is under full load.

10. The combination of elements as in claim 8 which includes, support means positioned beneath the center part of one run of said metal belt between the ends thereof and providing support therefor, and upon which the inside of said metal belt is adapted to slide.

11. The combination of elements as in claim 8 which includes, a second narrow strip of a relatively deformable and elastic material firmly attached along its length to the inside of said loop generally parallel to said first strip, and a pair of mounting wheels respectively engaging said second strip at the inside ends of said loop.

12. In a conveyor arrangement of the type having an endless loop metal belt positively driven and aligned by relatively large-diameter and narrow width mounting wheels rotatably mounted upon parallel axes and being generally in the same plane, a wide thin metal belt for use in the form of an endless loop having high tensile strength and being substantially non-stretchable and flexible, said metal belt being sufficiently thick and resilient to tend to maintain the belt in substantially rigid semi-cylindrical condition at the ends of the loop and in generally flat condition therebetween, a narrow structure of a relatively deformable and elastic material firmly attached along the entire length of said belt inside of said loop generally parallel to the edge of the belt, and a driving and supporting structure for said loop comprising a pair of large diameter wheels and means mounting said wheels upon parallel axes and with their side faces in exact alignment and spaced from each other the exact distance to support said loop, said wheels being of narrow width and having grooves therein which snugly receive said narrow structure of relatively deformable and elastic material.

13. In a conveyor arrangement of the type having an endless loop metal belt positively driven and aligned by relatively large-diameter and narrow width mounting wheels rotatably mounted upon parallel axes and being generally in the same plane, a wide thin metal belt for use in the form of an endless loop having high tensile strength and being substantially non-stretchable and flexible, said metal belt being sufficiently thick and resilient to tend to maintain the belt in substantially rigid semi-cylindrical condition at the ends of the loop and in generally flat condition therebetween, and a narrow structure of a relatively deformable and elastic material firmly attached along the entire length of said belt inside of said loop generally parallel to an edge of the belt, said narrow structure at the inside ends of said loop being positively engageable with said large diameter wheels whereby said loop is supported and capable of being driven with great tractive force by one of said wheels and said belt remains in side-to-side alignment with said wheels.

References Cited in the file of this patent

UNITED STATES PATENTS

| | | |
|---|---|---|
| 723,504 | Titus | Mar. 24, 1903 |
| 1,055,591 | Afzelius | Mar. 11, 1913 |
| 2,066,206 | Laurie | Dec. 29, 1936 |
| 2,094,747 | Philips | Oct. 5, 1937 |

FOREIGN PATENTS

| | | |
|---|---|---|
| 947,622 | France | Jan. 17, 1949 |